United States Patent [19]
Tarbox et al.

[11] Patent Number: 4,554,598
[45] Date of Patent: Nov. 19, 1985

[54] SINGLE REVOLUTION DISK SECTOR FORMATTER

[75] Inventors: Bruce H. Tarbox, Billerica; Donald J. Rathbun, Andover, both of Mass.; Taian Su, Palo Alto, Calif.

[73] Assignee: Honeywell Information Systems, Inc., Waltham, Mass.

[21] Appl. No.: 613,936

[22] Filed: May 25, 1984

[51] Int. Cl.⁴ .............................................. G11B 5/09
[52] U.S. Cl. ..................................................... 360/48
[58] Field of Search .............................. 360/48, 39, 40

[56] References Cited
U.S. PATENT DOCUMENTS
4,494,156  1/1985  Kadison et al. ........................ 360/48

Primary Examiner—Vincent P. Canney
Attorney, Agent, or Firm—George Grayson; Nicholas Prasinos

[57] ABSTRACT

A track of a disk device is formatted on a single revolution of the disk by using a read only memory (ROM) to store control codes and a random access memory (RAM) to store address field and data field bytes. A DMA controller simultaneously addresses ROM and RAM. Control codes are read into a control first in-first out memory and data codes are read into a data first in-first out memory. The control codes are applied to a decoder whose output signals control cyclic redundancy check and error detection and correction logic as well as the data first in-first out memory. The serial output from both the data first in-first out memory and the cyclic redundancy check logic are written on disk track.

4 Claims, 4 Drawing Figures

| | CONTROL PROM 14 & RAM 12 DECREMENTING ADDRESS LOCATION (HEXADECIMAL) | CONTROL PROM 14 CONTENTS (HEXADECIMAL) | RAM 12 CONTENTS (HEXADECIMAL) |
|---|---|---|---|
| INTERSECTOR GAP PLO SYNC | 199 – 186 | 00 | |
| FLAG | 2AF | 02 ⎫ | 33 |
| LEFT CYL | 2AE | 02 | 01 |
| RIGHT CYL | 2AD | 02 ⎬ SECTOR 1 IDENTIFICATION BYTES | SECTORS 2-42 IDENTIFICATION BYTES 23 |
| HEAD | 2AC | 02 | 01 |
| SECTOR | 2AB | 02 | |
| FIRST CRC | 2AA | 03 ⎭ | 00+X |
| | 2A9 – 1B4 | REPEAT FOR SECTORS 2-42 | |
| ID SYNC | 185 | FE | |
| SECOND CRC | 184 | 03 | |
| ADDRESS FIELD PAD WRITE SPLICE PLO SYNC | 183 – 173 | 00 | |
| BYTE SYNC | 172 | F2 | FE |
| 256 DATA BYTES | 171 – 072 | 02 | 6D |
| EDAC | 071 – 06E | 04 | |
| DATA PAD INTERSECTOR GAP | 06D – 060 | 00 | |

FIG. 3

SINGLE REVOLUTION DISK SECTOR FORMATTER

BACKGROUND OF THE INVENTION

1. Field of the Invention

This invention relates generally to disk mass storage subsystems and more specifically to the formatting of a complete track during a single revolution of the disk.

2. Description of the Prior Art

Many computing systems of the early 1950's used magnetic drum storage for their data files, particularly in airline reservation and banking applications. The data was processed by one read/write head per track. Bit densities were in the order of 100 bits per inch.

Magnetic disk storage was developed to improve the volumetric efficiency by storing bits on the disk surfaces rather than the periphery of a drum and have a single head per disk floating within microinches of the disk surface. This allowed the track density to be increased to in excess of 2,000 bits per inch.

The addressing of data now had to include the selecting of a cylinder (comparable track positions on each surface), a read/write head, and a sector within a track. Each track must include this addressing information to assure that the correct sector is addressed.

Today's disk devices are either hard sector devices or soft sector devices. The hard sector device is prepared by the supplier in a fixed format to which the system designer must conform. The soft sector device is formatted by the system designer and may be rewritten at will.

OBJECTS OF THE INVENTION

Accordingly, it is a primary object of the invention to have an improved disk subsystem.

It is an object of the invention to have a disk subsystem with an improved system throughput.

It is another object of the invention to have a disk subsystem having improved track formatting apparatus.

It is still another object of the invention to format a track of a disk subsystem with a single revolution of the disk.

SUMMARY OF THE INVENTION

A data processing system includes a mass storage disk subsystem requiring soft sector formatting. A single track is divided typically into 42 sectors, each sector including 320 bytes of information.

A DMA controller includes a number of channels, each channel having the capability of storing a number of addresses and a range. The range is typically set to the number of bytes being transferred under control of that channel.

A read only memory (ROM) and a random access memory (RAM) are simultaneously addressed by the DMA controller. The ROM stores a number of control codes in some address locations and a number of hexadecimal 00 bytes in other address locations. The RAM stores the address field bytes including flag, cylinder, head and sector numbers along with the 256 bytes of data.

The control codes read from ROM are applied to a decoder which generates a distinct signal for each control code. Successive control codes read from ROM are stored in a control first in-first out (FIFO) memory.

A hexadecimal 02 code read from ROM enables a data first in-first out (FIFO) memory to store the data byte read from a RAM location specified by the same address location in ROM storing the hexadecimal 02 code. A hexadecimal 00 code read from ROM is stored in the data FIFO memory which is enabled by a memory write signal from the DMA controller.

The serial output of the data FIFO is clocked and written on the disk track between successive occurrences of an index pulse.

A cyclic redundancy check (CRC) generator checks the address field by monitoring the data FIFO serial output to calculate the CRC characters, which are transferred to the disk on the CRC generator receiving a hexadecimal 03 code from the control FIFO. The CRC generator is reset by a hexadecimal 06 code from the control FIFO.

An error detection and correction (EDAC) logic element which checks the data field and is reset by a hexadecimal 03 receives data bytes at the parallel input of the data FIFO. The calculated EDAC characters are transferred to the data FIFO under control of a hexadecimal 04 code and sent to the disk over the data FIFO serial output.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 3 shows the layout of the read only and random access memories; and

DESCRIPTION OF THE PREFERRED EMBODIMENT

A disk drive, typically a random access mass storage device, with 8 inch rotating disks may store 24 megabytes or 40 megabytes, depending on the number of disks in the device.

Each disk includes 605 tracks for storing bytes of information. Each track stores 13,440 bytes which are organized in 42 sectors of 320 bytes each. The disk is characterized as a soft sector disk since sector header information is generated by software. A hard sector disk has the sector header information permanently written on the disk.

Figure 1:
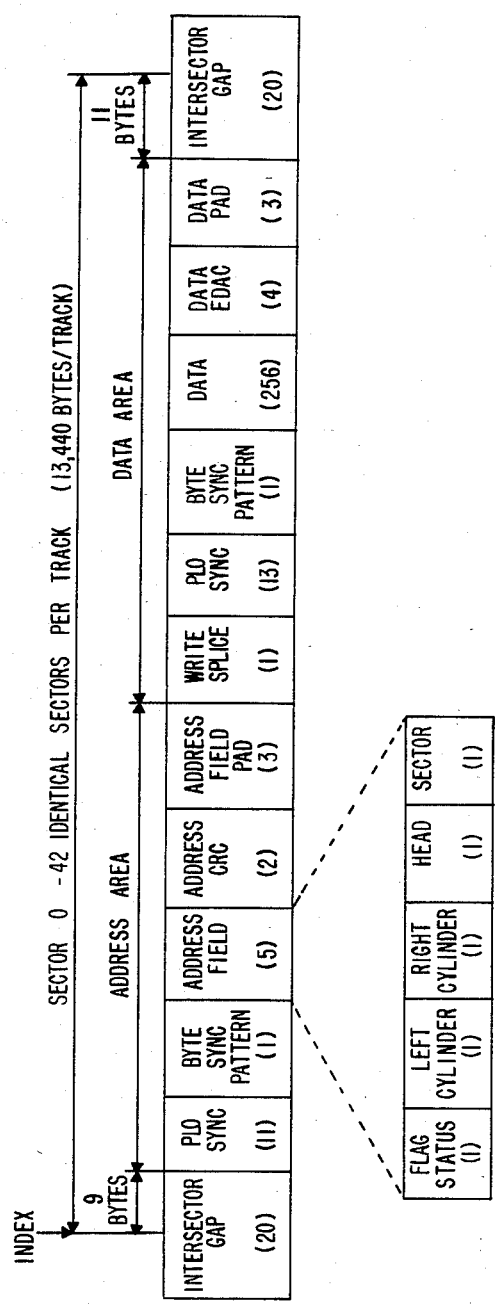
FIG. 1 shows the format of a disk track.

FIG. 1 shows the information format of one sector of a track. The format includes header information identifying track and variable data information. The format includes a 20 byte intersector gap, a 22 byte address area and a 278 byte data area.

Starting 11 bytes before an index mark (one per disk drive) is the 20 byte long intersection gap, each byte being hexadecimal 00. The intersection gap allows the logic to resynchronize to the next sector of the track being read.

The address area includes an 11 byte phase lock oscillator (PLO sync) of all ZERO bits to allow the read-data phase locked oscillator to become phase and frequency synchronized with the data bits recorded on the media.

A hexadecimal FE (binary 1111 1110) is written into the byte sync pattern area to establish byte synchronization between the logic and the data written on the disk.

The address field consists of 5 bytes. The flag status byte, hexadecimal 33, differentiates between a vendor-supplied format which provides a flag status byte of hexadecimal 00 and a controller-generated format. Two bytes, the left and right cylinder bytes, specify one of 605 cylinders. A cylinder includes the same track number on each surface. One byte selects a head to read one track of a selected cylinder and the last byte identifies one of 42 sectors.

The address cyclic redundancy check (CRC) bytes are written in accordance with a predetermined formula to verify that all of the bytes written in the address area are correct. Data integrity is maintained by the logic recalculating and verifying the CRC bytes whenever the address field is read.

The address field pad, 3 bytes of hexadecimal 00, insures that there is sufficient room on the track to write and read the last bits of the address CRC codes.

The data area of the sector includes a write splice field, one byte of hexadecimal 00. The write splice field allows time for the write drivers to turn on and reach a recording amplitude sufficient to insure that data bytes are written properly after the address area is read for selecting the desired sector during a normal write operation.

The phase locked oscillator (PLO sync) field includes 13 bytes of hexadecimal 00 to allow the phase locked oscillator to become phase and frequency synchronized with the data bits read on the media.

The byte sync pattern, hexadecimal FE, establishes byte synchronization for the data field which follows. The data field stores 256 bytes of data sent to the disk drive by the CPU. The data field is initialized to repeat hexadecimal 6D (0110 1101).

The four bytes of data error detection and correction codes (EDAC) maintain data integrity by recalculating and verifying the data field check codes when the data field is read. The EDAC corrects up to an 11 bit error.

The data pad field, 3 bytes of hexadecimal 00, insures that there is enough space in the sector in which to write the data field.

Figure 2:
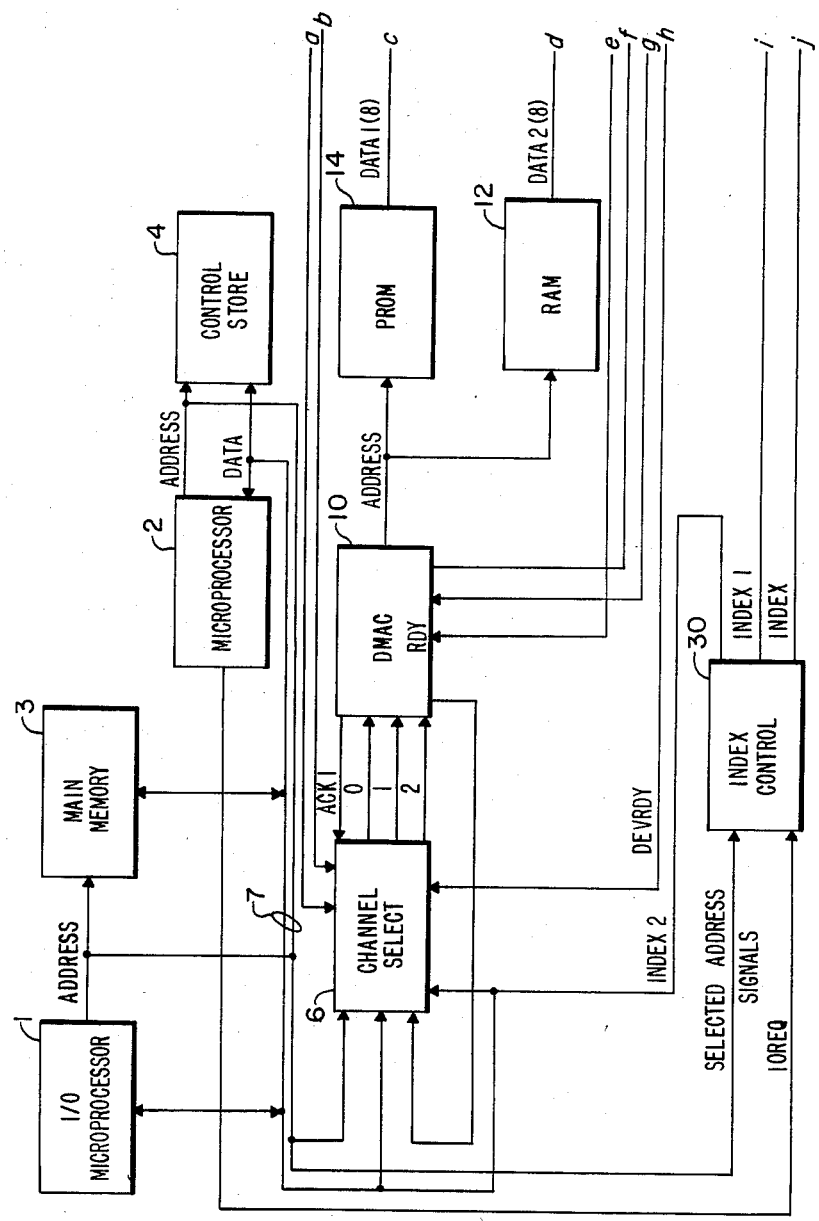
FIG. 2 is a block diagram of the logic for formatting the track.
Figure 2:
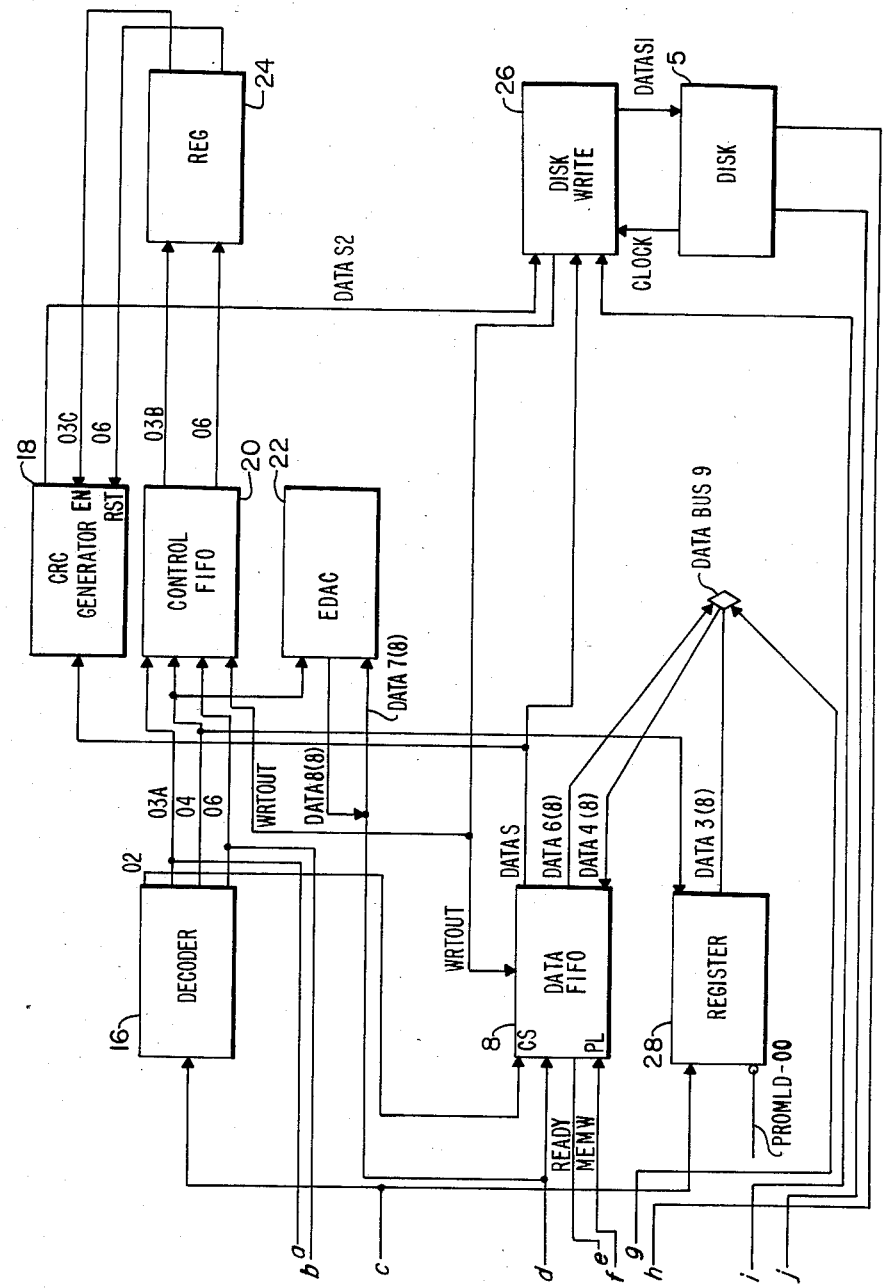

FIG. 2 shows the logic involved in the formatting of a selected one of the 605 tracks on one of the disk surfaces. The formatting of each track requires a preparation phase and an execution phase.

The preparation phase is initiated by an input/output (I/O) microprocessor 1 which controls all peripheral subsystems including the disk subsystem. I/O microprocessor 1 sends an order to microprocessor 2 over data bus 7 to format a designated track. Microprocessor 2 addresses a control store 4 to read out a microprogram. Microprocessor 2 executes the microinstructions of the microprogram as shown in block diagram form in FIG. 4.

A multimode direct memory access controller (DMAC) 10 during normal operation controls the transfer of data bytes between a disk 5 and a RAM 12. During the sector formatting operation, DMAC 10 addresses a programmable read only memory (PROM) 14 and a random access memory (RAM) 12. PROM 14 stores codes which define the formatting fields and also stores bytes of hexadecimal 00 to be stored in predetermined fields of the sector. RAM 12 stores the five address field bytes for 42 sectors, the byte sync pattern and the 256 data bytes of hexadecimal 6D.

FIG. 3 shows the contents of the PROM 14 and the RAM 12 as specified address locations. The DMAC 10 includes 4 independent channels which may be individually controlled. Three of the four channels are used during the execution phase. Channel 2 controls the formatting of the 5 bytes of the address field and the first CRC byte. Channel 0 controls the formatting of the remainder of the sector. Channel 1 keeps count of the 42 sectors and prevents channel 0 from turning on when the track is fully formatted.

Microprocessor 2 instructs the DMAC 10 to start the execution phase when a first occurrence of an index pulse is received by activating channel 0 of DMAC 10 via data bus 7 and channel select 6. DMAC 10 is then in full control of the formatting.

Referring to both FIGS. 2 and 3, a one per revolution index pulse INDEX is received from disk 5 and applied to index control 30.

Microprocessor 2 generates an input/output request signal IOREQ as well as selected address signals which are applied to index control 30 and together with the INDEX pulse generates an INDEX1 signal which is active for the complete revolution of the disk. The data FIFO 8 generates a READY signal to the DMAC 10 to request a data byte. The DMAC 10 generates a MEMW signal which is applied to a PL input of data FIFO 8 to parallel load the first byte, hexadecimal 00 from PROM 14. The DMAC 10 generates 20 addresses, hexadecimal 199 through 186. PROM 14 stores hexadecimal 00 in each of the 20 address locations. The hexadecimal 00 data signals DATA1 are applied to a register 28 which is enabled by a PROMLD-00 signal. Signal PROMLD-00 indicates that the DMAC 10 addressed both the PROM 14 and the RAM 12, but only the PROM 14 output data is read.

The output signal from register 28, DATA3, is applied to a data bus 9 from which a DATA4 signal is applied to the data FIFO 8. The INDEX1 signal is applied to the disk write 26 to enable the serial transfer of bytes over signal DATAS1. Disk write 26 is also responsive to the INDEX1 signal to generate a write out signal WRTOUT which enables the serial output of data FIFO 8 and control FIFO 20.

The hexadecimal 00 bytes are transferred out of the data FIFO 8 serially over signal lines DATAS to a disk write logic 26. The disk write logic 26 clocks the bits on the DATAS signal line to the disk 5 clock signal for transfer to the disk 5 over signal line DATAS1.

The next address hexadecimal 185 of PROM 14 stores hexadecimal FE, the byte sync pattern byte. The DATA1 signal FE is applied to the data FIFO 8 and to a decoder 16 which is responsive to the three low order bits of binary 1111 1110 (hexadecimal FE) to generate signal 06. Signal 06 is applied to channel select 6 to select channel 2 of DMAC 10.

The DMAC 10 sends address hexadecimal 2AF to PROM 14 and RAM 12. PROM 14 reads out hexadecimal 02 which is applied to decoder 16. The 02 signal from decoder 16 is applied to the CS terminal of data FIFO 8 to activate the data FIFO 8 to store hexadecimal 33, the flag status byte, received over signal line DATA2 from RAM 12.

On successive address cycles, the contents of address locations hexadecimal 2AE, 2AD, 2AC and 2AB including left cylinder hexadecimal 01, right cylinder hexadecimal 23, head hexadecimal 01 and sector hexadecimal 00 of RAM 12 are stored in data FIFO 8. Also hexadecimal 02 applied from PROM 14 to decoder 16 selects data FIFO 8 by means of signal 02.

The bytes stored in data FIFO 8 are applied to a cyclic redundancy check (CRC) generator 18 to generate the check character. The next address location, hexadecimal 2AA, of PROM 14 stores a hexadecimal 03A which when applied to decoder 16 generates signal 03B. Signal 03B is applied to a register 24. Output signal 03C is applied to the enable terminal of CRC generator 18. This results in the first CRC byte to be read over signal DATAS2 to disk write 26. The 02 signal is not generated for this cycle thereby disabling the RAM 12 output.

The 03A signal is also applied to channel select 6 to select channel 0 of DMAC 10. Address location hexadecimal 184 stores a hexadecimal 03 in PROM 14 which is applied to decoder 16. Again the 03C signal is applied to the CRC generator 18 through register 24 to cause the second CRC byte to be transferred to disk write 26 over signal DATAS2.

The 3 byte address field pad, the write splice byte and the 13 byte PLO sync fields include 17 bytes of hexadecimal 00 which are read from address locations, hexadecimal 183 through 173, of PROM 14 via register 28, data bus 9, data FIFO 8 and disk write 26.

Address location hexadecimal 172 of PROM 14 stores a hexadecimal F2. The hexadecimal 2 of F2 causes hexadecimal FE to be read from address location hexadecimal 172 of RAM 12 for transfer to the disk 5 via data FIFO 8, signal DATAS, disk write 26 and signal DATAS1.

The 256 address locations, hexadecimal 171 through 072, store hexadecimal 02. This causes 256 occurrences of hexadecimal 6D to be read from RAM 12 to disk 5 via disk write 26. Also the 256 bytes and in addition the byte sync character hexadecimal FE are applied to EDAC 22 via the 8 DATA2 signal lines.

The next 4 address locations, hexadecimal 071 through 06E, store a hexadecimal 04 code in PROM 14 which is applied to decoder 16 to generate an 04 signal. The 04 signal is applied to the EDAC 22 to enable the computed EDAC bytes to be stored in the data FIFO 8 via signals DATA8 and DATA7 and transferred to disk 5 via disk write 26. The 04 signal is also applied to register 28 to disable its output signal The 14 address locations, hexadecimal 06D through 060, store hexadecimal 00 in PROM 14. This is written on disk 5 for the 3 bytes of data pad and the 11 byte intersector gap via signal DATA1, register 28, signal DATA3, data bus 9, signal DATA4, data FIFO 8, serial signal DATAS and disk write 26.

The DMAC 10 channel 0 range was initialized to 314 bytes. The range was decremented for each byte written on the disk 5 so that at the end of writing the sector the range is ZERO. This results in the DMAC 10 generating an end of process (EOP) signal which is applied to channel select 6 to select channel 1 of the DMAC 10. The range stored in channel 1 is decremented to 41 and channel 0 of DMAC 10 is again activated since the disk 5 is ready for the next sector; signal DEVRDY is active.

Since channel 0 of the DMAC was put in the auto initialize mode, the range is automatically reset to 314 bytes and the sector 01 is written on track 291. In this case, the address field is read from address locations hexadecimal 2A9 through 2A4. The remainder of the bytes of sector 01 are determined by the same address locations as in sector 00.

Channel 1 is normally reset by the ACK1 acknowledge signal from the DMAC 10; however, the ACK1 signal is suppressed when the range stored in channel 1 has counted down to ZERO indicating that all 42 sectors were written on the track. The system now awaits the INDEX pulse when it is received by index control 30, resulting in signal INDEX1 being reset and signal INDEX2 being generated. Signal INDEX2 applied to channel select 6 resets channel 1 in the DMAC 10. Signal INDEX2 is also applied to microprocessor 2 via data bus 7 to indicate that the entire track was processed. Signal INDEX1 being deactivated in turn deactivates both the WRTOUT signal and the DATAS1 signal from disk write 26, thereby concluding the disk write operation.

Microprocessor 2 is a Zilog Z80A microprocessor. DMAC 10 is an AM 9517A Multimode DMA Controller manufactured by Advanced Micro Devices Inc., 901 Thompson Place, Sunnyvale, Ca. 94086.

Data FIFO 8 and control FIFO 20 are Fairchild 9403 First In-First Out (FIFO) Buffer Memories manufactured by Fairchild, 464 Ellis Street, Mountain View, Ca. 94042.

The CRC generator 18 are a pair of Fairchild 9401 CRC generator/checkers.

The EDAC 22 is an AM Z8065 Burst Error Processor manufactured by Advanced Micro Devices Inc.

The decoder 16 is a 74S138 logic circuit.

Figure 4:
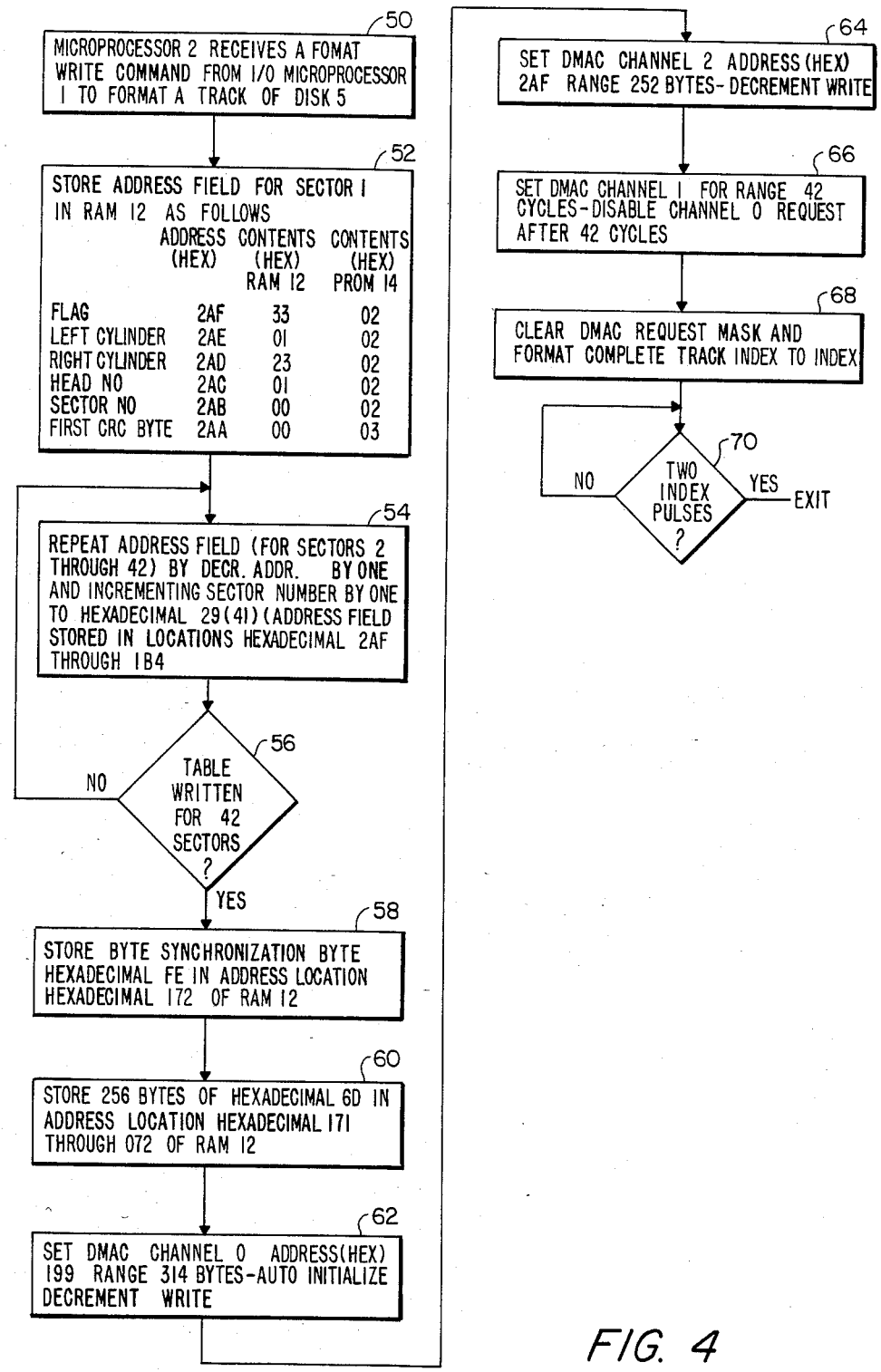
FIG. 4 shows the flow diagram of the microprogram which controls the track formatting.

Referring to FIG. 4, block 50 shows microprocessor 2 receiving a format write command from I/O microprocessor 1. The command includes a cylinder address and a head address along with a function code indicating a task word and a command code indicating a format write operation.

Block 52 shows the address field bytes for sector 00, head 01 and cylinder 291 (hexadecimal 0123) stored in address locations hexadecimal 2AF through 2AB. Also stored with the address field is the first CRC byte cleared to hexadecimal 00.

Block 54 loops to load the address locations storing the remaining 41 sectors with the address field bytes and the first CRC byte. The addresses of RAM 12 are decremented by one and the sector number is incremented by one.

Decision block 56 determines when the address byte field for all 42 sector blocks are loaded into RAM 12.

Block 58 stores the byte synchronization byte, hexadecimal FE, into address location hexadecimal 172 of RAM 12.

Block 60 stores the data field hexadecimal 6D in 256 address locations, hexadecimal 171 through 072, of RAM 12.

Block 62 loads the registers of channel 0 of DMAC 10 with starting address hexadecimal 199, a range of 314 bytes, bits to indicate a write operation, a decrementing address and an auto initialize operation. The auto initialize bit results in the starting address resetting to hexadecimal 199 and the range resetting to 314 after the range has counted down to ZERO for each sector write operation. The 314 bytes include all bytes except the 5 address field bytes and the first CRC code 03.

Block 64 sets the registers of channel 2 of DMAC 10 to a starting address of hexadecimal 02AF, a range of 252 bytes (42×6), a write and a decrement address operation.

Block 66 sets the registers of channel 1 of DMAC 10 for a range of 42.

In block 68 the microprocessor 2 clears the DMAC 10 request mask and enables the generation of the channel 0 select signal 0 thereby starting the formatting of the track or the appearance of the first occurrence of the INDEX signal.

Decision block 70 tests for the second occurrence of the INDEX pulse by testing the INDEX2 signal which is applied to the data bus of bus 7 to indicate to the microprocessor 2 that the track is written.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. Apparatus for writing a predetermined format on a track of a mass storage disk drive during one revolution of the disk, said apparatus comprising:

DMA controller means for storing a plurality of address signals and generating a sequence of said plurality of address signals;

read only memory (ROM) means coupled to said DMA controller means and responsive to said sequence of said plurality of address signals for generating sequence of ROM signals representative of fixed data codes or control codes stored in first locations specified by said sequence of said plurality of address signals;

decoder means coupled to said ROM means and responsive to said sequence of ROM signals representative of said control codes for generating a sequence of control signals;

random access memory (RAM) means coupled to said ROM means and said decoder means and responsive to said sequence of said plurality of address signals for generating a sequence of RAM signals representative of variable data codes stored in second locations specified by selected ones of said sequence of said plurality of address signals;

data first in-first out (FIFO) means coupled to said DMA controller means, said decoder means, said ROM means and said RAM means and responsive to a memory write signal, a first control signal in a first state and said sequence of RAM signals for storing a sequence of variable data codes, and responsive to said memory write signal, said first control signal in a second state, a second control signal and said sequence of ROM signals for storing a sequence of fixed data codes, said FIFO means generating an output signal serializing said sequence of fixed and said variable data codes in said predetermined format for writing on said track during said one revolution of the disk.

2. The apparatus of claim 1 further comprising:

control FIFO means coupled to said decoder means for storing said sequence of control signals representative of a second control signal, a third control signal and a fourth control signal, and generating said first, second and third output control signals in conformance with said predetermined format.

3. The apparatus of claim 2 further comprising:

cyclic redundancy check (CRC) means for verifying address field data coupled to said data FIFO and said control FIFO and responsive to said third output control signal for resetting said CRC means, and responsive to said output signal for calculating a first CRC character and a second CRC character, and responsive to said first output control signal for storing said first and said second CRC characters in said data FIFO means for transfer by said output signal to said track in said predetermined format.

4. The apparatus of claim 3 further comprising:

error detection and correction (EDAC) means for verifying data field data coupled to said control FIFO means and said RAM means and responsive to said first output control signal for resetting said EDAC means, and responsive to said sequence of RAM signals representative of said data field data for generating a first, a second, a third and a fourth EDAC character, said EDAC means being responsive to said second output control signal for transferring said first, said second, said third and said fourth EDAC characters to said data FIFO means for transfer by said output signal to said track in said predetermined format.

* * * * *